United States Patent

[11] 3,590,370

| [72] | Inventor | Donald W. Fleischer |
| | | Ambler, Pa. |
| [21] | Appl. No. | 818,466 |
| [22] | Filed | Apr. 9, 1969 |
| [45] | Patented | June 29, 1971 |
| [73] | Assignee | Leeds & Northrup Company |
| | | Philadelphia, Pa. |

[54] METHOD AND APPARATUS FOR DETECTING THE OPEN-CIRCUIT CONDITION OF A THERMOCOUPLE BY SENDING A PULSE THROUGH THE THERMOCOUPLE AND A REACTIVE ELEMENT IN SERIES
3 Claims, 2 Drawing Figs.

[52] U.S. Cl. .................................................. 324/51, 340/256
[51] Int. Cl. ................................................... G01r 31/02
[50] Field of Search ........................................ 324/51, 73, 171; 340/256

[56] References Cited
UNITED STATES PATENTS

| 2,040,495 | 5/1936 | Nichols | 324/51 X |
| 2,576,892 | 11/1951 | Stanton | 324/73 |
| 2,814,774 | 11/1957 | Wong | 324/51 |
| 2,976,485 | 3/1961 | Bartz | 324/51 |
| 3,141,994 | 7/1964 | Hornfeck et al. | 340/256 X |
| 3,468,164 | 9/1969 | Sutherland | 324/51 X |
| 3,496,343 | 2/1970 | Johanson | 324/171 UX |

Primary Examiner—Gerard R. Strecker
Attorneys—William G. Miller, Jr. and Raymond F. MacKay ABSTRACT: A pulse is sent serially through the thermocouple and the primary of a pulse transformer. The pulse has a duration longer than that sufficient to charge the distributed capacity in the thermocouple and leadwire. At the end of the pulse period the thermocouple is disconnected and the transformer primary is provided with a discharge path. The resulting potential across the secondary indicates a good thermocouple. If that potential does not appear, an open circuit is indicated. The transformer can be replaced by a capacitor which becomes charged only when the thermocouple is a complete circuit.

PATENTED JUN 29 1971

3,590,370

INVENTOR·
DONALD W. FLEISCHER

BY William G. Miller Jr.

AGENT 3,590,370

METHOD AND APPARATUS FOR DETECTING THE OPEN-CIRCUIT CONDITION OF A THERMOCOUPLE BY SENDING A PULSE THROUGH THE THERMOCOUPLE AND A REACTIVE ELEMENT IN SERIES

BACKGROUND OF THE INVENTION

This invention relates to thermocouple testing apparatus and more particularly to means for rapidly checking a number of thermocouple circuits to detect if any of the thermocouple circuits are open-circuited.

Heretofore a wide variety of open-circuit detecting methods and apparatus have been utilized to determine whether or not the thermocouples or the connecting leadwire was open-circuited. However, with the increased usage of digital computers for rapidly scanning a large number of temperature measurements to measure the temperature at a large number of points, it becomes necessary to test a large number of thermocouple circuits to make sure that none of them are open-circuited and the test on each individual thermocouple circuit must be made in a very short period of time. In making the test in a very short period of time it is also necessary to distinguish the difference between a true open-circuit and a high resistance circuit such as one containing 1,000 or more feet of thermocouple leadwire. It is also necessary to distinguish between a complete circuit and the high capacity of long connecting wires which may, under some test conditions, look like a complete circuit.

It is therefore an object of this invention to provide a method and means for detecting an open-circuit condition in a thermocouple circuit in a very short period of time.

SUMMARY OF THE INVENTION

In carrying out this invention there is provided a reactive element, a circuit means for passing a unidirectional pulse serially through the reactive element and the thermocouple being checked so that the reactive element is charged when the thermocouple circuit is not in an open-circuit condition, means providing a discharge current path for the reactive element after termination of the pulse and means for detecting the flow of discharge current from the reactive element so as to provide an indication of the condition of the thermocouple circuit.

DESCRIPTION OF THE PREFERRED EMBODIMENTS

Figure 1:
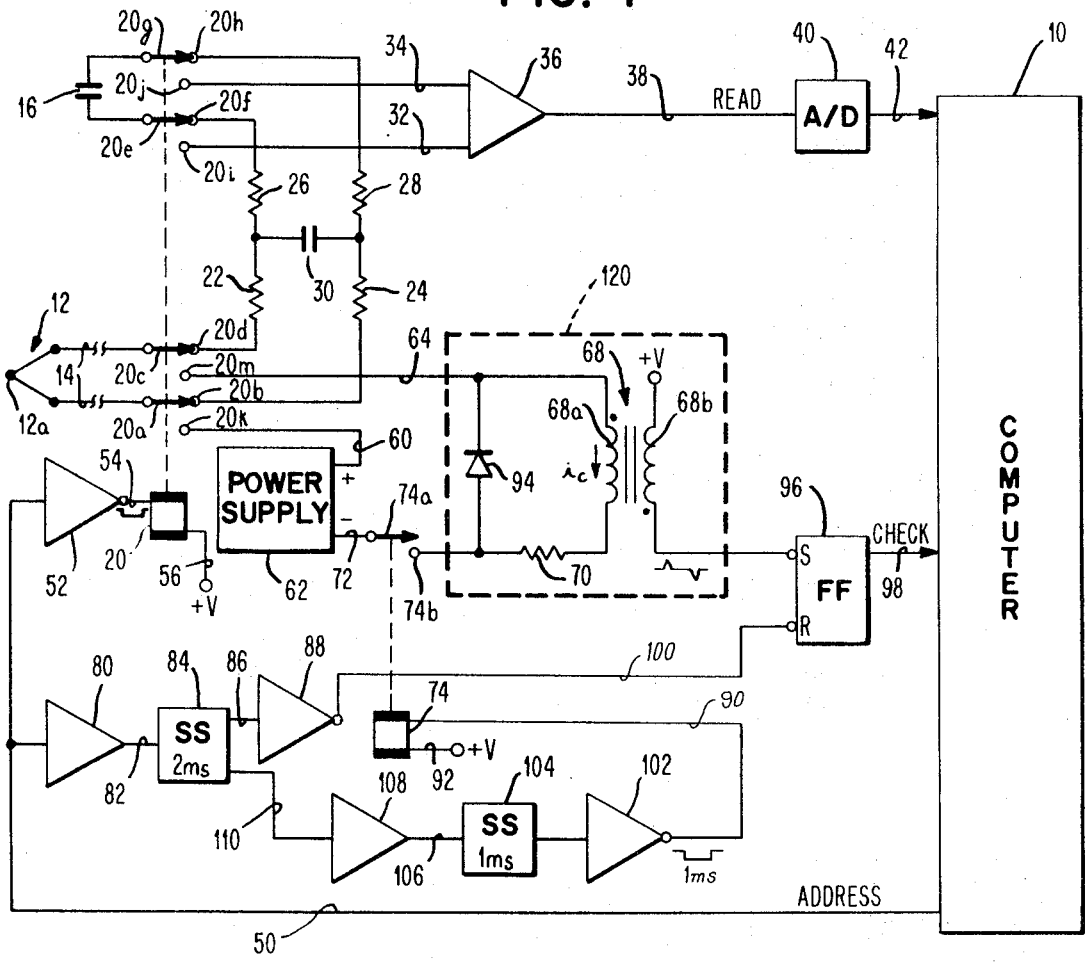
FIG. 1 is a circuit diagram of one form of the invention.

In FIG. 1 there is shown a circuit in which the computer 10 is utilized to measure the temperature at a number of points such as the point where the thermocouple junction 12a of thermocouple 12 is located. The computer 10 is normally capable of measuring a large number of temperatures in a small period of time. For the purpose of simplifying the description of the invention there is shown in FIG. 1 only the connections to a single thermocouple 12, it being readily evident to those skilled in the art how the computer 10 can be sequentially connected to make a large number of temperature measurements.

In FIG. 1 the junction 12a of thermocouple 12 produces a voltage which is a function of the temperature at that point. That voltage is transmitted to the computer location by way of the thermocouple leadwire 14 which may, under some conditions, be very long.

The flying capacitor 16 is charged to the same voltage by current from the thermocouple and subsequently the computer measures the stored voltage on capacitor 16 as a measure of the temperature at junction 12a. By using the flying capacitor it is possible to reduce common mode interference in the thermocouple circuit.

To change capacitor 16 the relay contacts of relay 20 must be in their deenergized positions, as shown. Thus, the normally closed contacts 20a and 20b as well as 20c and 20d connect the leadwire 14 to resistors 22 and 24, which are individually connected in series with the separate leadwires. The resistors 22 and 24 are in turn serially connected to resistors 26 and 28, respectively. A capacitor 30 is connected in shunt between the points where the respective resistors 24 and 28 and resistors 22 and 26 connect so that the network which includes resistors 22, 24, 26 and 28 and capacitor 30 forms a filter network in series with the leadwire 14 for the purpose of filtering transient pickup from that measuring circuit.

The connection between the leadwires 14 and the flying capacitor 16 is then completed by the normally closed contacts 20e and 20f and the normally closed contacts 20g and 20h of relay 20.

To read the temperature at the junction 12a it is necessary to energize relay 20 so as to connect the relay contacts 20e and 20g, respectively, to contacts 20i and 20j so that the flying capacitor 16 is connected to the two input leads 32 and 34 of differential amplifier 36 so as to provide on the amplifier output line 38, the "read" line, a potential representative of the temperature being read at the junction 12a. That potential is introduced as an input to the analog-to-digital converter 40 which produces an output in the form of a digital signal on line 42 to the computer 10.

At the same time that the voltage on the flying capacitor 16 is being read, namely after energization of relay 20, the contacts 20a and 20c will be respectively connected to the contacts 20k and 20m so as to connect the thermocouple 12 to a thermocouple checking circuit to determine if the thermocouple 12 is open-circuited and thereby establish whether or not the output signal on line 42 is valid or not.

The relay 20 is energized when the computer 10 has addressed thermocouple 12 to obtain a reading from that thermocouple. The addressing is accomplished by sending a pulse on the address line 50 from the computer to amplifier 52 which then provides by way of line 54 the pulse necessary to energize relay 20. Relay 20 is connected by line 54 to amplifier 52 and through line 56 to a terminal which is maintained at a potential +V. It is therefore desirable that the signal on the address line 50 be maintained at a level such that the level on line 54 will normally be at +V. Then when the address pulse is supplied on line 50, it will produce a change in level on line 54 from +V to zero for a short period of time as, for example, 4 ms.

After addressing thermocouple 12 by supplying the address pulse on line 50 and thereby energizing relay 20, thermocouple 12 and its connecting leadwire 14 are connected in series with the lead 60 from the positive side of DC power supply 62, the connecting line 64, the primary winding 68a of the pulse transformer 68, and current limiting resistor 70 as well as the negative power supply lead 72 whenever the relay contacts 74a and 74b are closed by energization of relay 74.

In order to give the relay 20 sufficient time to operate, it is desirable to delay the actuation of relay 74 after energization of relay 20. This delay may be 2 ms. as shown in FIG. 1. This delay is accomplished by the circuit connecting the address line 50 through amplifier 80 and line 82 to the 2 ms. single shot circuit 84 which then provides an output on line 110 to amplifier 108. The output of 108 in turn provides an input to the 1 ms. single shot circuit 104 by way of line 106 with the output of the single shot 104 being amplified by inverting amplifier 102 to energize relay 74 by way of connecting line 90. The pulse produced on line 90 is of 1 ms. duration and is a negative going pulse starting at a potential +V and going to a potential of zero at a time which is 2 ms. delayed from the time of the appearance of the pulse at relay 20. The relay 74 is connected by way of line 92 to a potential point +V so that the relay 74 is only energized during the 1 ms. duration of the pulse appearing on line 90.

It will therefore be evident that the power supply 62 provides a current path by way of line 60, contact 20h, contact 20a, leadwire 14, thermocouple 12, contact 20c, contact 20m, line 64 through the primary 68a of pulse transformer 68, resistor 70 and contact 74b and 74a and lead 72. Upon energization of relay 74 to close contacts 74a and 74b a current $i_c$ is produced in the primary of pulse transformer 68 to provide an inductive charge on the transformer by increasing the flux linking the primary and secondary coils of the transformer. This charging essentially ceases after 1 ms. when the contacts 74a and 74b open. The opening of contacts 74a and 74b cause a collapsing of the flux linking the transformer primary 68a and the secondary 68b causing the current $i_c$ to tend to continue flowing so as to discharge the charge built up on the transformer. The continued flow of current will occur through the diode 94 which shunts the primary 68a and resistor 70.

The resultant negative going pulse on the secondary 68b caused by the collapsing magnetic field will cause a setting of flip-flop 96 indicating by the resulting signal on check line 98 that the thermocouple and leadwire formed a complete circuit. The computer 10 then checks at a particular time after each address to determine if flip-flop 96 has been set.

Prior to the appearance of the negative going pulse the flip-flop 96 was in the reset state by virtue of the negative going pulse produced by inverting amplifier 88 on line 100 in response to the positive going 2 ms. pulse produced on line 86 by the single shot circuit 84 upon the occurrence of each address pulse on line 50.

When there is an open circuit either in the leadwire 14 or the thermocouple 12, the current $i_c$ will not continue to flow throughout the 1 ms. period during which the relay 74 is energized and hence upon deenergization of relay 74, there will be no collapse of flux to cause a negative going pulse to appear across the secondary 68b. In the absence of the negative going pulse there will not be a setting of flip-flop 96 but instead it will remain reset; consequently, the output of the flip-flop 96 on line 98 when checked by the computer will indicate to the computer that either the thermocouple 12 or its leadwire 14 is open-circuited.

The 1 ms. period during which the checking current is flowing through the thermocouple 12 and leadwire 14 is an adequate period of time so that if the thermocouple is open, any capacity between the long connecting leadwires 14 will have been charged prior to the disconnection of the power supply 62 by deenergization of relay 74. Consequently, the current $i_c$ will have ceased to flow before deenergization of relay 74 and hence there will be no negative going pulse appearing across the secondary 68b and the existence of the capacity between the leadwires 14 will not provide a false indication of a complete circuit through the thermocouple 12 when there is, in fact, an open circuit.

It will be evident from the above description that the thermocouple open-circuit check is made by passing a unidirectional pulse serially through the thermocouple and a reactive element, which in FIG. 1 is the pulse transformer 68, so as to charge that reactive element when the thermocouple and its leadwires form a complete circuit. The state of the reactive element is then determined as an indication as to whether or not the thermocouple circuit was open-circuited. In FIG. 1 the state of the reactive element is detected by allowing the reactive element to discharge through diode 94. This discharge provides a voltage across the secondary 68b of the transformer 68 which then provides the necessary indication as to the state of the thermocouple circuit. Thus, when the negative going pulse appears at the time of discharge of the reactive element, the circuit is a complete circuit and hence capable of providing an accurate measure of the temperature at junction 12a whereas when the negative going pulse does not appear when the power supply is disconnected by deenergization of relay 74, then an open-circuited thermocouple is indicated.

It will be evident that the transformer 68 of FIG. 1 can be replaced by another type of reactive element such as a capacitor. The circuit of FIG. 2 shows the necessary arrangement for replacing the reactive element of FIG. 1 with a capacitor.

Figure 2:
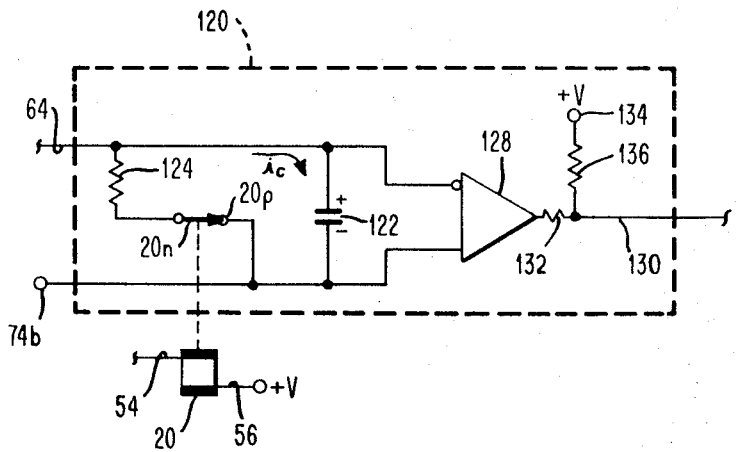
FIG. 2 is a circuit diagram of another form of a portion of the circuit of FIG. 1.

Thus, the elements shown within the dashed line block 120 of FIG. 2 can be used to replace the elements shown within the dashed line block 120 of FIG. 1.

With the arrangement of FIG. 2, the line 64 provides a path for current flow through capacitor 122 to contact 74b whenever relay 20 is energized so as to disconnect the shorting resistor 124, normally connected across capacitor 122 by normally closed contacts 20n and 20p. Thus, whenever the relay 20 is energized and relay 74 is energized, if the thermocouple 12 and its leadwire form a complete circuit, the current flow $i_c$ will charge capacitor 122 to a potential having the polarity shown. The existence of the charge on capacitor 122 is then detected by differential amplifier 128 which has a sign reversing input at its upper terminal and a nonsign reversing input at its lower terminal so that the output of amplifier 128 will go negative when the capacitor 122 is charged with the polarity shown. When the output of amplifier 128 goes negative, line 130 goes to ground causing a set input at flip-flop 96. This occurs because the normal level of the output line 130 will be at a positive potential due to the voltage divider action of resistors 132 and 136.

With the arrangement of FIG. 2 whenever the thermocouple 12 or its leadwire 14 is open-circuited, the capacitor 122 will not be charged by a current $i_c$ and the output appearing on line 130 will not change from its positive potential; and therefore flip-flop 96 will remain reset so that when the computer checks the state of flip-flop 96, the existing reset state indicates that the thermocouple 12 or its leadwire 14 is open-circuited.

The single thermocouple checking circuit of FIG. 1 or FIG. 2 can be used to sequentially check each of the large number of thermocouple circuits connected to computer 10 by providing any of a number of well-known means for commutating the checking circuit just as the "read" line of the computer can be commutated.

It will be evident to those skilled in the art that the power supply 62 and relay 74 can be replaced by a pulse source and transistor switches may be used to replace the many relay contacts.

I claim:
1. A method for high speed checking of thermocouples connected by long leadwire comprising
   sending a pulse serially through the thermocouple to be checked and a reactive element, said pulse being of duration such that the capacity between the long leadwires is charged before the end of the pulse so that a reactive field within said reactive element is present at the end of said pulse only when said thermocouple forms a complete circuit,
   releasing said reactive field by providing a current discharge path for said reactive element after the termination of said pulse, and
   detecting the flow of said discharge current, said flow being indicative of a complete circuit through said thermocouple.
2. A circuit for the high speed checking of thermocouples having long leadwire connections comprising
   an inductor,
   means for passing a unidirectional pulse serially through said inductor and the thermocouple to be checked, said pulse being of duration sufficient to charge up any capacity between said long leadwires before the end of said pulse so that a reactive field is present in said inductor at the end of said pulse only when said thermocouple forms a complete circuit,
   means providing a path for the discharge of current by said inductor to allow the collapse of the reactive field after the termination of said pulse, and
   means for detecting the flow of discharge current upon the collapse of said reactive field, the flow of said current being indicative of a complete circuit through the thermocouple being checked.
3. A high speed thermocouple continuity checking circuit comprising a transformer having a primary winding and a secondary winding,
a DC power source,
switching means connected in series with said DC power source for applying a unidirectional pulse serially through the primary winding and the thermocouple to be checked, said pulse being of duration sufficient so that a magnetic field is set up only when said thermocouple forms a complete circuit,
a diode connected across the primary winding and poled in a direction opposite to that of the DC power source for providing a path for the discharge of current by the primary winding during the collapse of the magnetic field after the termination of said pulse,
a flip-flop circuit normally maintained in one state, and
means for applying to the flip-flop circuit during the collapse of the magnetic field the output of the secondary winding resulting from the flow of discharge current in the primary winding to change said flip-flop circuit to an opposite state indicative of a complete circuit through said thermocouple to be checked.